Dec. 18, 1962  P. F. SANBORN  3,068,914
SAWMILL
Filed Nov. 23, 1959  11 Sheets-Sheet 1

Inventor
PAUL F. SANBORN
By
Kimmel & Crowell
ATTORNEYS

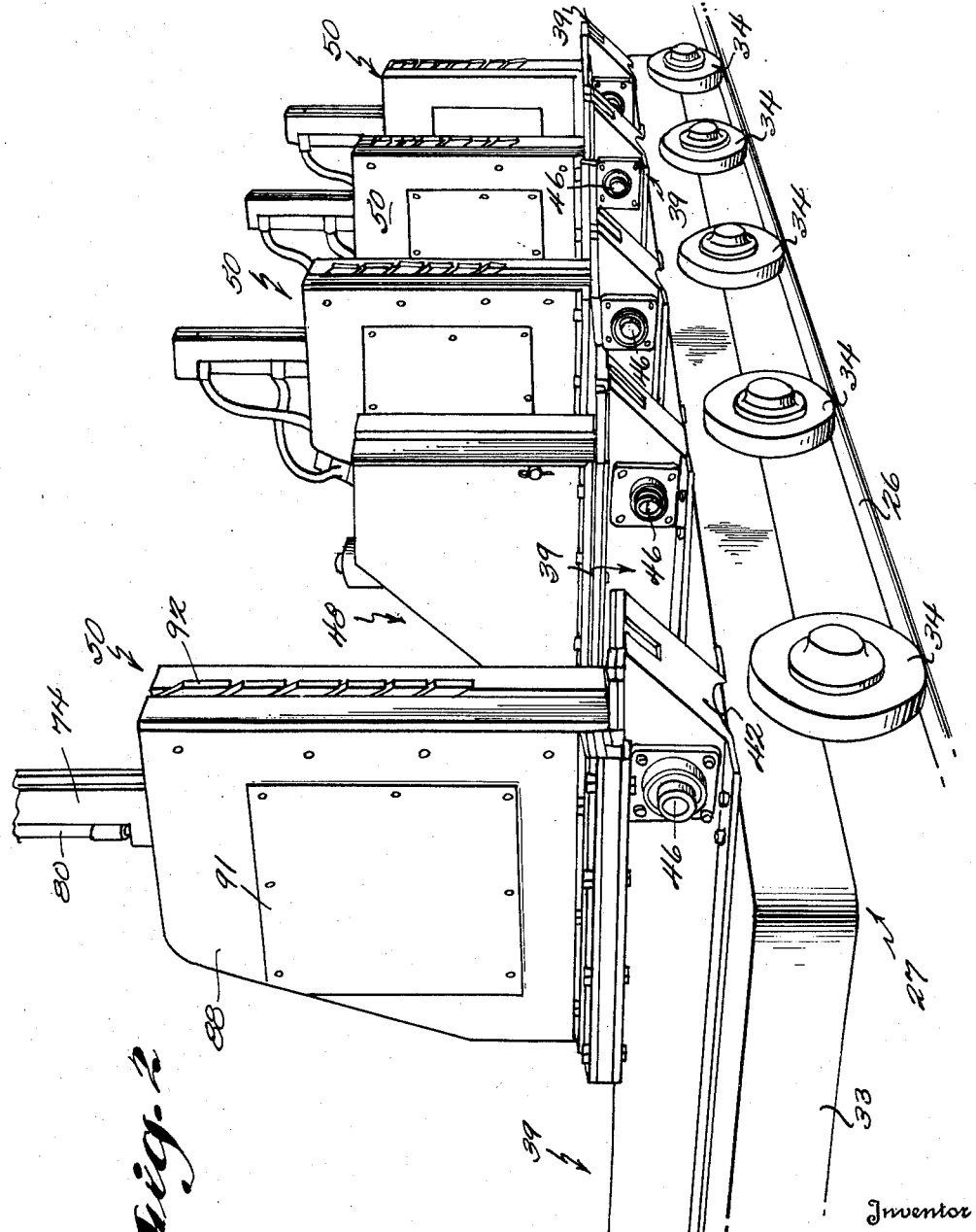

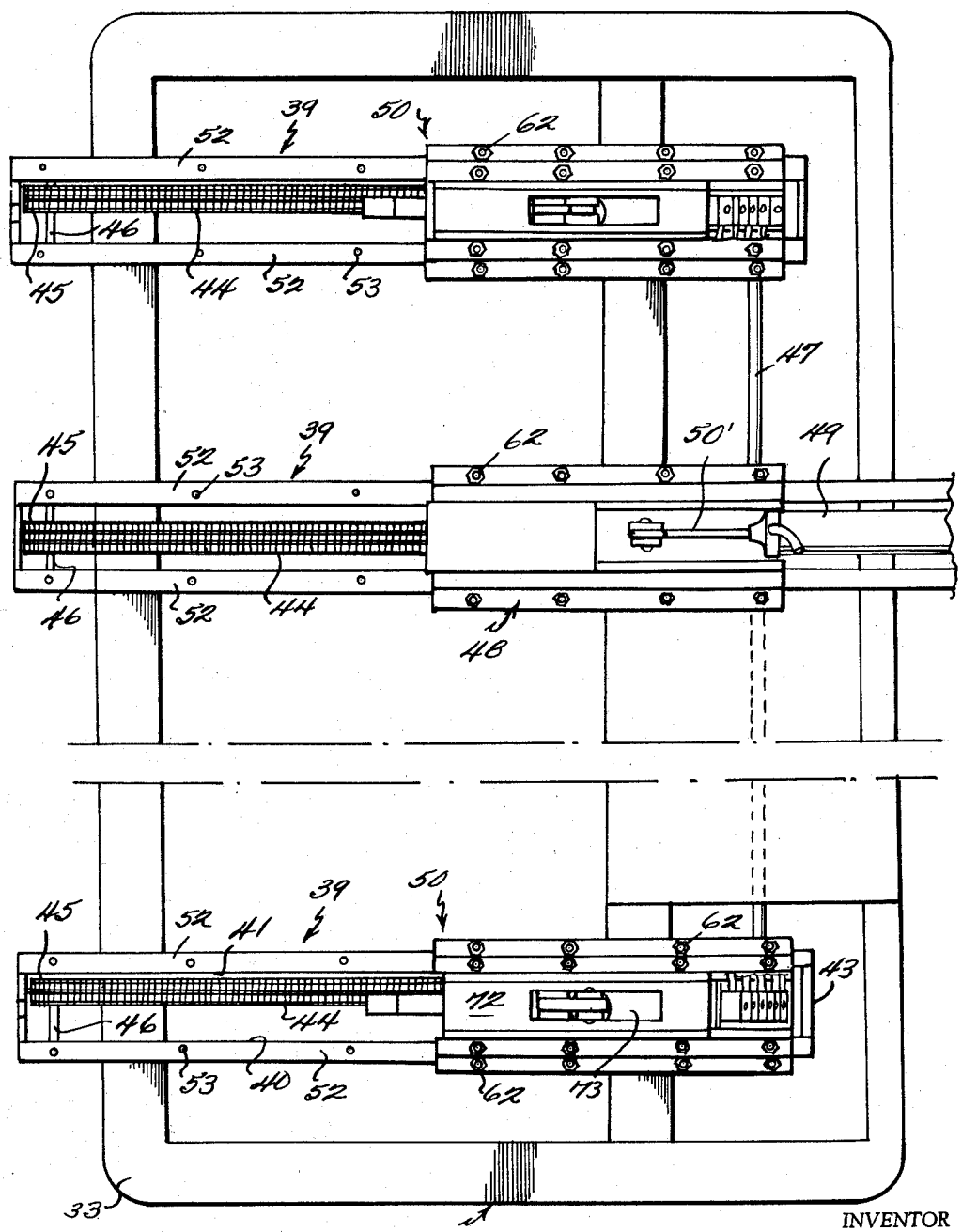

Dec. 18, 1962  P. F. SANBORN  3,068,914
SAWMILL
Filed Nov. 23, 1959  11 Sheets-Sheet 4
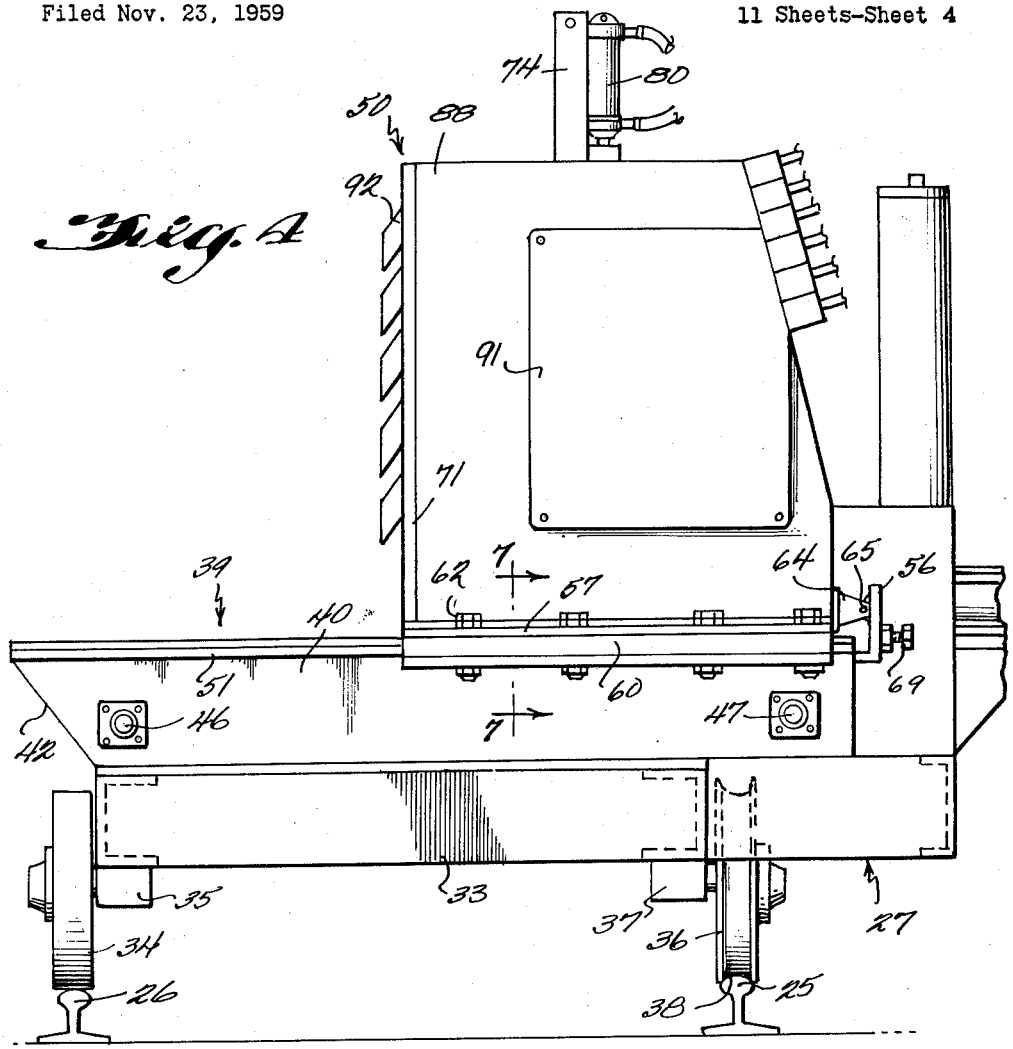
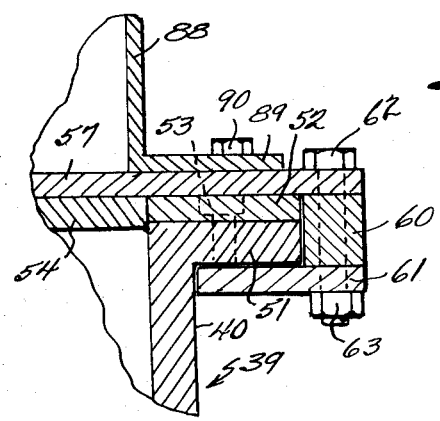
INVENTOR
PAUL F. SANBORN
BY
Kimmel & Crowell
ATTORNEYS

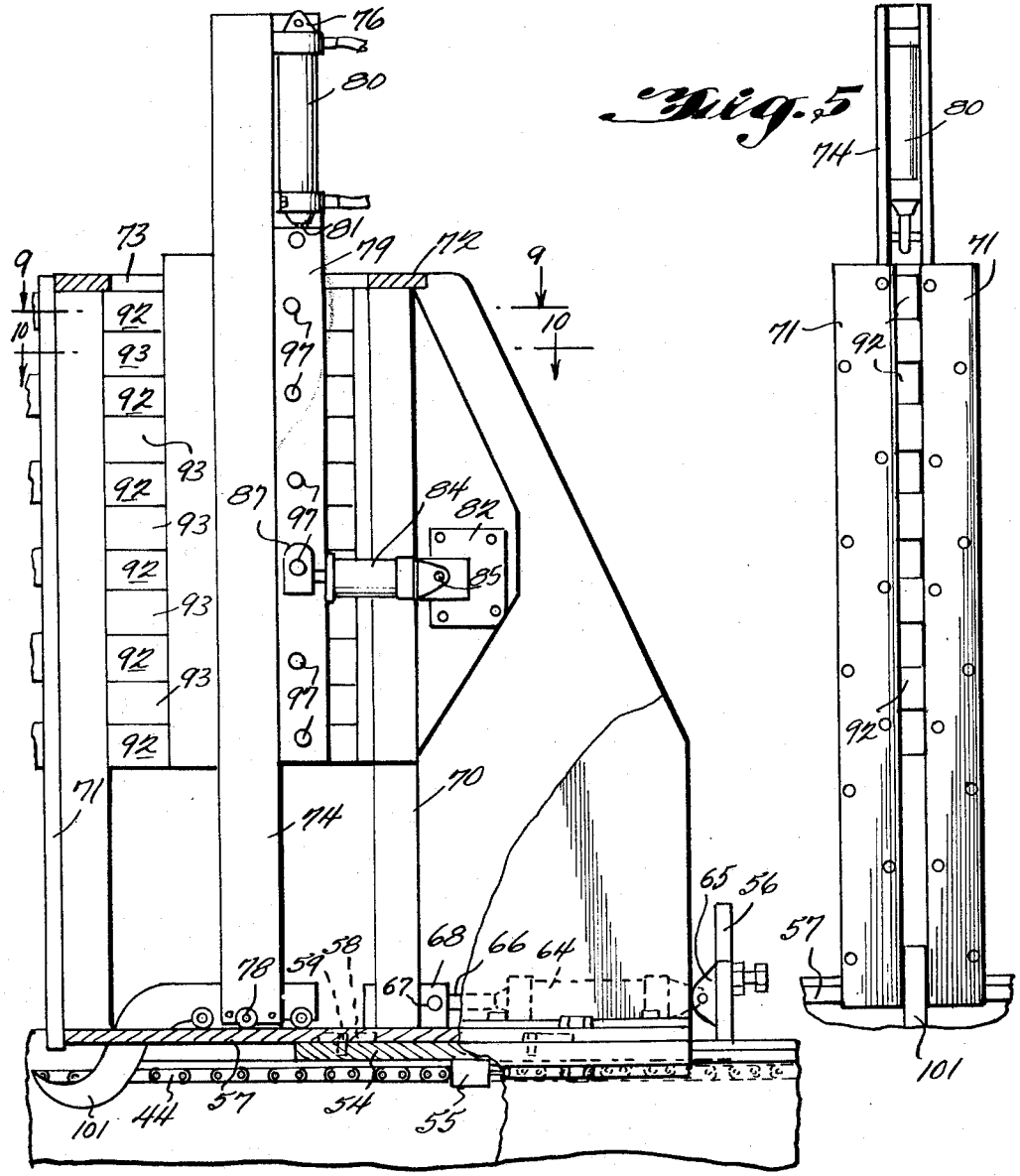

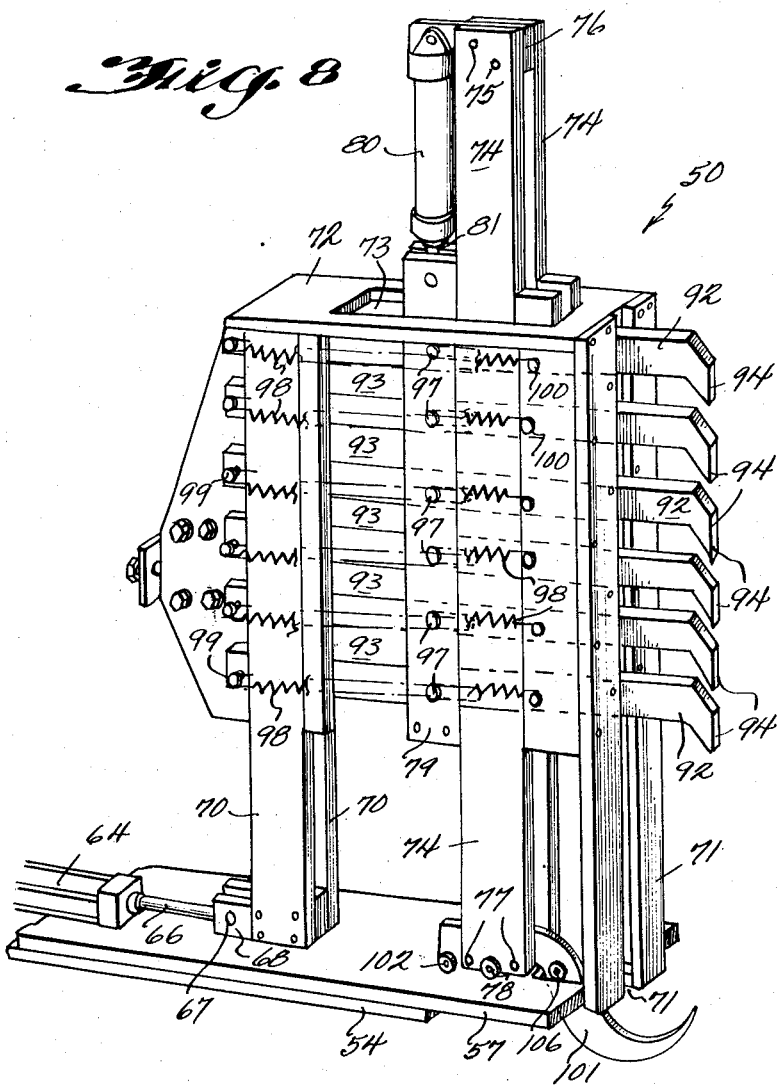

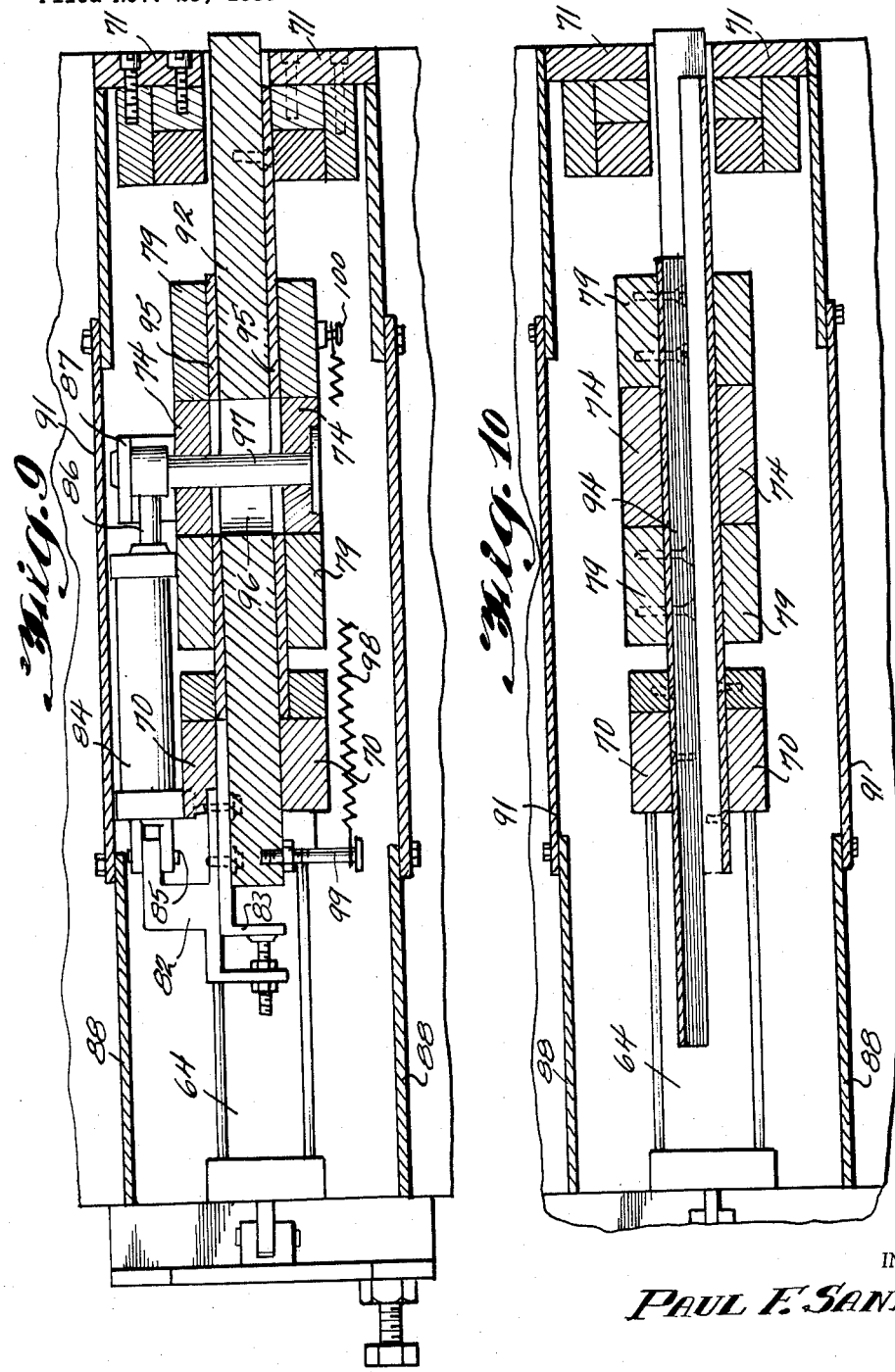

Dec. 18, 1962 P. F. SANBORN 3,068,914
SAWMILL

Filed Nov. 23, 1959 11 Sheets-Sheet 8

INVENTOR
PAUL F. SANBORN

BY
Kimmel & Crowell
ATTORNEYS

Dec. 18, 1962 P. F. SANBORN 3,068,914
SAWMILL
Filed Nov. 23, 1959 11 Sheets-Sheet 9

Inventor
PAUL F. SANBORN

By
Kimmel & Crowell
ATTORNEYS

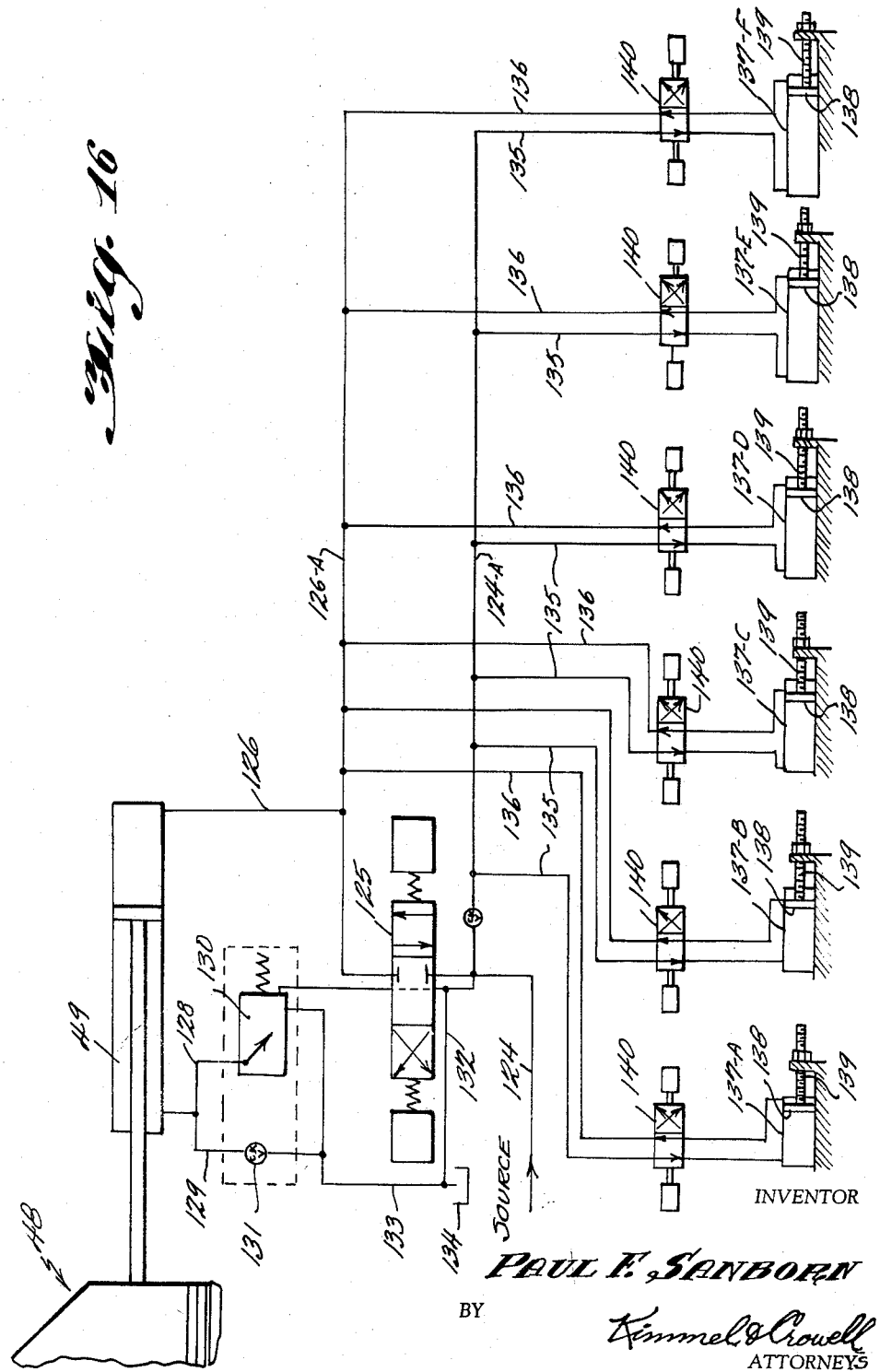

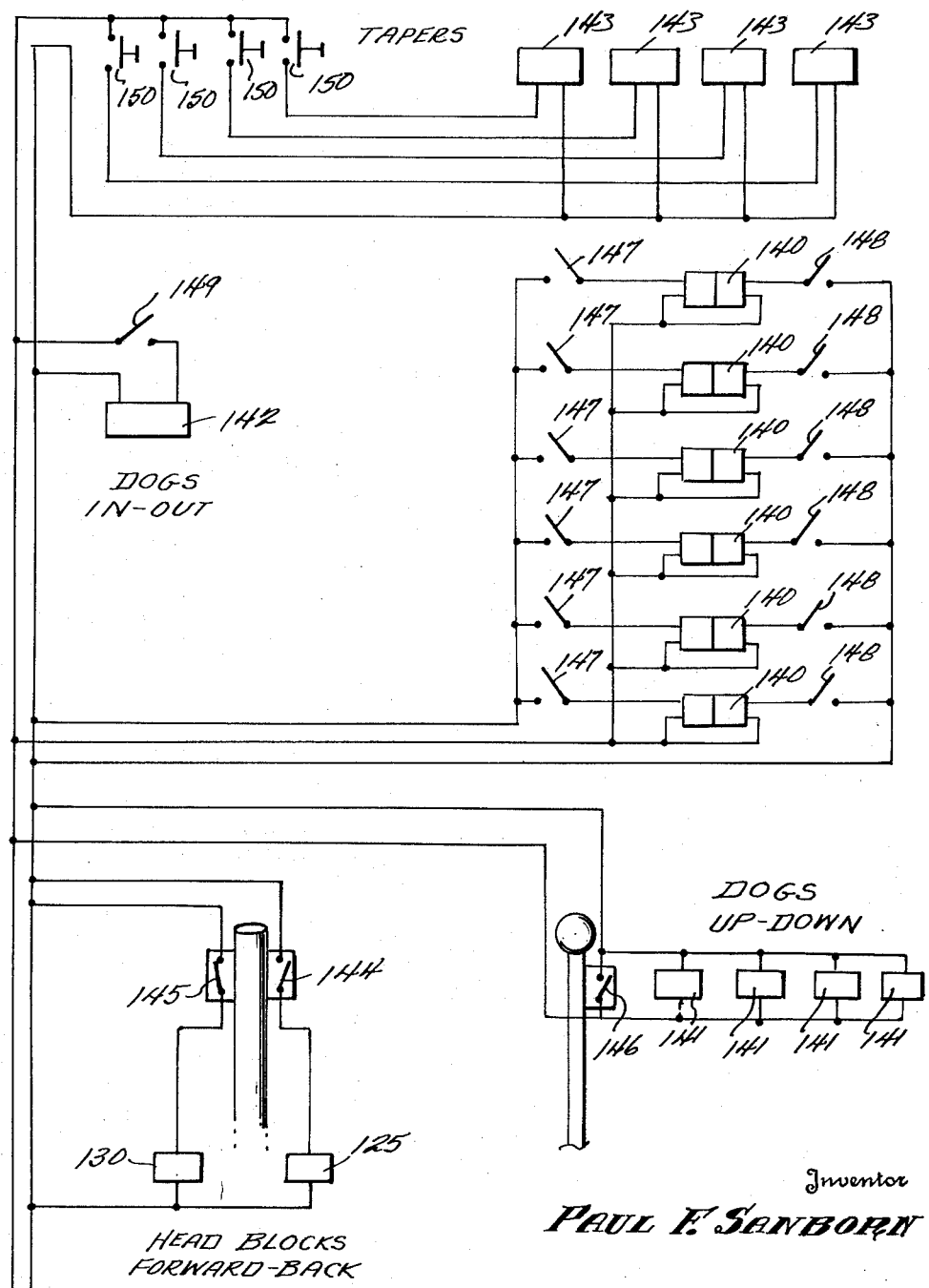

United States Patent Office 3,068,914
Patented Dec. 18, 1962

3,068,914
SAWMILL
Paul F. Sanborn, South Waterford, Maine
Filed Nov. 23, 1959, Ser. No. 854,843
4 Claims. (Cl. 143—118)

The present invention relates to a sawmill and particularly to a sawmill in which the log is handled mechanically under the control of an operator.

The primary object of the invention is to provide a sawmill having means under the control of an operator for mechanically handling the log, including an accurate automatic set works.

Another object of the invention is to provide a sawmill in which the sawing operation is completely controlled by a single operator and in which a substantially greater quantity of boards can be sawed than was possible in sawmills constructed in accordance with the prior art.

A further object of the invention is to provide a sawmill in which the carriage is moved past the saw by a longitudinally extending hydraulic ram.

Another object of the invention is to provide a sawmill set works having hydraulic actuating means in which accurate setting is obtained by injecting a pre-determined quantity of hydraulic fluid into the hydraulic set works mechanism.

Other objects and advantages will become apparent in the following specification when considered in light of the attached drawings, in which:

FIGURE 2 is a perspective view of the sawmill carriage shown partially broken away for convenience of illustration;

FIGURE 3 is an enlarged fragmentary top plan view of the sawmill carriage shown partially broken away for convenience of illustration;

FIGURE 4 is a fragmentary end elevation of the sawmill carriage;

FIGURE 5 is a front elevation of one of the knees;

FIGURE 6 is a view similar to FIGURE 4, partially broken away and in section for convenience of illustration;

FIGURE 7 (sheet 4) is an enlarged fragmentary longitudinal vertical sectional view taken along the line 7—7 of FIGURE 4, looking in the direction of the arrows;

FIGURE 8 is a perspective view of one of the knee blocks with the cover removed;

FIGURE 9 is an enlarged fragmentary horizontal sectional view taken along the line 9—9 of FIGURE 6, looking in the direction of the arrows;

FIGURE 10 is an enlarged fragmentary horizontal sectional view taken along the line 10—10 of FIGURE 6, looking in the direction of the arrows;

FIGURE 11 is a fragmentary top plan view of one of the carriage actuating rams;

FIGURE 12 is an enlarged fragmentary longitudinal sectional view of the ram of FIGURE 11;

FIGURE 13 is an enlarged fragmentary longitudinal sectional view of the right hand end of FIGURE 11;

FIGURE 14 is an enlarged fragmentary vertical sectional view of the piston of the ram in FIGURE 11;

FIGURE 16 is a semi-diagrammatic view of the set works hydraulic circuits; and

FIGURE 17 is a diagrammatic view of the electric circuits controlling the hydraulic circuits.

Figure 1:
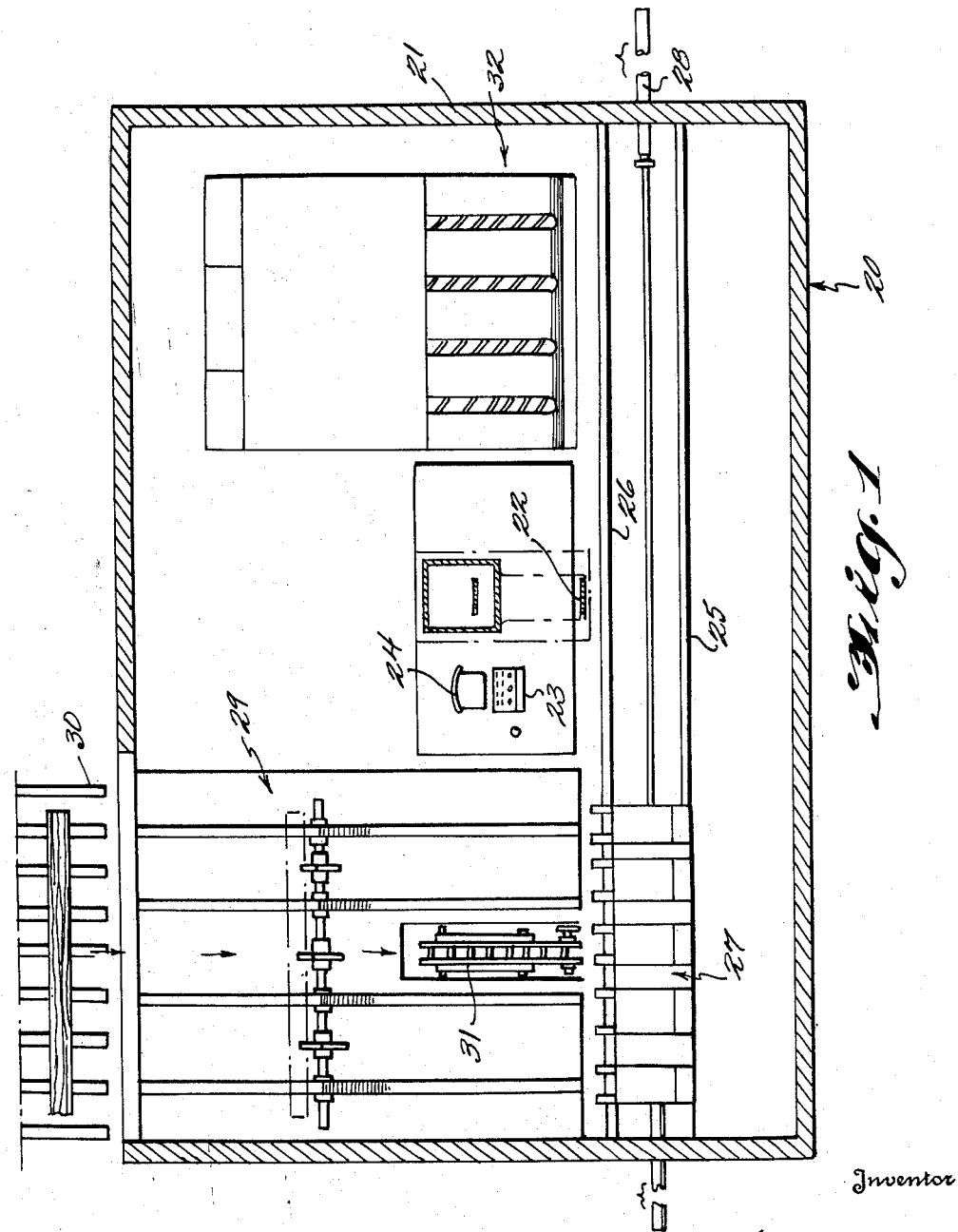
FIGURE 1 is a fragmentary top plan view of a sawmill constructed in accordance with the invention.

Referring now to the drawings in detail wherein like reference characters indicate like parts throughout the several figures, the reference numeral 20 indicates generally a sawmill constructed in accordance with the invention, as seen in top plan in FIGURE 1.

The sawmill 20 is positioned in a building 21 and includes a centrally positioned band saw 22 driven by means (not shown). A control console 23 is positioned adjacent the band saw 22 and has an operator's seat 24 arranged rearwardly thereof. A pair of rails 25, 26 extend horizontally past the band saw 22 and have a carriage 27 mounted for reciprocation thereon. A hydraulic ram 28 at each end of the rails 25, 26 moves the carriage 27 from one end thereof to the other. The carriage 27 is moved past the band saw 22 by an hydraulic servo cylinder to be later described, and is adapted to carry a log into engagement with the band saw 22 so as to cut a board therefrom.

A log conveyor 29 is positioned in the building 21 to move logs from a support 30 on to the carriage 27. A swinging arm 31 is mounted in the carriage end of the conveyor 29 to turn the logs on the carriage 27 and to hold the logs in engagement with the carriage 27 while they are being secured thereto. A board and slab conveyor 32 is positioned in the building 21 on the discharge side of the saw 22 so as to handle boards and slabs cut from the log mounted on the carriage 27. The conveyors 29, 32 and the arm 31 form no part of the present invention and are of a conventional construction.

The carriage 27 (FIGURES 2–4) has a generally horizontal frame 33 supported by a plurality of relatively flat tread wheels 34 journalled in bearings 35 along one side of the frame 33 and engaging the rail 26. The opposite side of the frame 33 has a plurality of arcuately grooved tread wheels 36 journalled thereon in bearings 37 and resting on the arcuate top 38 of the rail 25. The wheels 34, 36 support the carriage 27 for longitudinal movement on the rails 25, 26 and the grooved tread wheels 36 cooperating with the arcuate surface 38 of the rail 25 guides the carriage 27 in a straight line movement.

A plurality of horizontal beams, indicated generally at 39, extend transversely of the carriage 27 and are supported on the generally horizontal frame 33. Each of the beams 39 comprises a pair of spaced apart transverse parallel members 40, 41 rigidly connected by an upwardly and outwardly sloping end plate 42 at the end of the beam 39 overlying the wheels 34. The beam 39 extends beyond the frame 33 and the wheels 34, as can be clearly seen in FIGURES 3 and 4, to form a log support. The ends of the members 40, 41 opposite the sloping plate 42 are rigidly connected by an upright plate 43 welded therebetween. A drive chain 44 is positioned between the members 40, 41 in each of the beams 39 and extends longitudinally thereof, having its opposite ends trained over sprockets 45. The sprockets 45 adjacent the plates 42 are journalled on transversely extending shafts 46, while the sprockets 45 at the opposite ends of the beams 39 are journalled on a single shaft 47 extending therebetween. A control knee, indicated generally at 48, is mounted for longitudinal sliding movement on one of the beams 39 intermediate other of the beams 39. The control knee 48 is connected to the chain 44 positioned therebelow and a hydraulic servo cylinder 49 is mounted on the frame 33 with the piston rod 50' thereof connected to the knee 48 so as to move the head block 48 with respect to the beam 39 on which it is supported. Movement of the knee 48 moves the chain 44 and rotates the shaft 47, thus moving the remaining chains 44 in the remaining beams 39. The arcuate operation of the hydraulic ram 49 will be described in detail below.

A plurality of dog carrying knees 50 are mounted for sliding movement on the remaining beams 39 on opposite sides of the control knee 48. The mounting of the control knee 48 and the dog carrying knees 50 on the beams 39 is identical and identical parts of the control knee 48 and the dog carrying knees 50 are designated by the same reference numerals.

The members 40, 41 each have an upper outwardly extending horizontal flange 51 integrally formed on the upper end thereof. A horizontal wear plate 52 is secured to the flanges 51 by a plurality of securing elements 53. A plate 54 (FIGURES 6 and 8) is positioned between the members 40, 41 adjacent the upper end thereof overlying the drive chain 44 and connected thereto by a fitting 55. The plate 54 extends horizontally and has a perpendicularly offset upright extension 56 integrally formed on the end thereof, overlying the grooved wheels 36. A base plate 57 is supported for endwise sliding movement on the wear plates 52 and engages the plate 54. The base plate 57 has a longitudinal slot 58 formed in the underside thereof to receive a pin 59 rigidly mounted in the plate 54 and extending upwardly therefrom. The slot 58 and pin 59 permit endwise relative movement between the plate 54 and the base plate 57, as will be described below.

The base plate 57 has longitudinally extending depending elements 60 (FIGURE 7) arranged along the opposite edges thereof. A generally rectangular guide member 61 is positioned beneath each of the elements 60 and extends inwardly therefrom in spaced parallel relation to the base plate 57. The guide member 61 extends under the element 51 of the channel members 40, 41 to prevent the base plate 57 from disengaging therefrom. A bolt 62 extends through the outer edges of the base plate 57, through the element 60 and through the guide member 61 so as to secure these elements together by means of a nut 63. The elements 60 engage the outer edges of the wear plates 52, maintaining the base plate 57 in aligned relation with the beam 39 on which it is supported. A hydraulic servo cylinder 64 (FIGURES 4 and 6) is pivotally connected at 65 to the extension 56 and has a piston rod 66 pivotally connected at 67 to a block 68 rigidly mounted on the upper surface of the base plate 57. The hydraulic servo cylinder 64 is adjustably connected to the extension 56 by a set screw 69 (FIGURE 4). Actuation of the hydraulic servo cylinder 64 moves the base plate 57 with respect to the plate 54, in a manner to be later described.

The dog carrying knees 50 each have a pair of spaced apart parallel upright frame members 70 rigidly secured to the block 68 at their lower ends. A second pair of spaced apart parallel frame members 71 are rigidly secured to the forward edge of the base plate 57, and extend rigidly upwardly therefrom. A generally rectangular plate 72 is rigidly supported on the upper ends of the frame members 70 and the frame members 71 in parallel relation to the base plate 57. The plate 72 has an elongated, generally rectangular aperture 73 (FIGURE 8) formed centrally therein. A pair of spaced parallel upright bars 74 are rigidly secured together at their upper ends by securing elements 75 and are separated by a spacer block 76. The lower ends of the bars 74 are rigidly secured together by securing elements 77 and are supported by rollers 78 engaging the upper surface of the base plate 57.

A dog frame 79 is mounted on the bars 74 for vertical sliding movement thereon. A hydraulic servo cylinder 80 is connected at its upper end to the spacer block 76 and has a piston rod 81 connected to the dog frame 79 so that upon actuation of the hydraulic servo cylinder 80 the dog frame 79 will be vertically moved along the bars 74. A bracket 82 (FIGURE 6) is secured to one of the frame members 70 by means of an adjustable mounting 83 and has a hydraulic servo cylinder 84 secured thereto by a pivot 85. A piston rod 86 from the hydraulic servo cylinder 84 is connected to the dog frame 79 by means of a bracket 87. The hydraulic servo cylinder 84, when actuated, moves the dog frame 79 and the upright bars 74 horizontally in the knee 50. Oppositely disposed side walls 88 (FIGURE 4) are rigidly secured to the frame members 71 and are provided with outwardly extending offset base flanges 89 secured to the base plate 57 by securing elements 90 (FIGURE 7). The side walls 88 are each provided with access doors 91 (FIGURE 4) to permit repairs and adjustments to be made to the head block mechanism.

A plurality of vertically spaced horizontally slidable dogs 92 are arranged for horizontal sliding movement in the dog frame 79 and are vertically separated by a plurality of spacer blocks 93 (FIGURE 8) rigidly secured to the dog frame 79. The dogs 92 are each provided with a single tooth 94 arranged in depending relation on the outer end thereof.

The dog frame 79 is provided with spaced wear plates 95 (FIGURE 9) engaging on opposite sides of the dogs 92 to maintain the dogs in guided relation within the frame. Each of the dogs 92 has a horizontal elongated slot 96 formed therein through which a pin 97 extends, passing through the dog frame 79 to limit the sliding movement of the dog 92 with respect to the dog frame 79. A coil spring 98 has one end connected to a pin 99 on the end of the dog 92 opposite the tooth 94, and the opposite end connected to a pin 100 on the dog frame 79. The coil spring 98 normally urges the dog 92 horizontally to move the tooth 94 outwardly away from the dog frame 79 to the limit of the length of the slot 96. Horizontal movement of the dog frame 79 simultaneously projects all of the teeth 94 of the dogs 92, while the slots 96 and springs 98 permit any of the dogs 92 engaging an obstruction to remain stationary when the remaining dogs 92 are being moved outwardly with the dog frame 79.

A dog 101 (FIGURE 8) is arranged for engaging the underside of a log in opposition to the dogs 92 and has a plurality of rollers 102 positioned thereon for support on the upper surface of the base plate 57. The dog 101 is positioned between the lower ends of the bars 74 and is moved therewith inwardly and outwardly as the dog frame 79 is adjusted by the hydraulic servo cylinder 84. The dog 101 is arcuate in form and is cammed into engagement with the underside of a log by the upwardly and outwardly sloping plate 42 of the beam 39.

From the above description it can be seen that the dogs 92 may be adjusted horizontally by means of the hydraulic servo cylinder 84 and may be adjusted vertically by the hydraulic servo cylinder 80, both with respect to the knee 50, and that the knee 50 can be adjusted with respect to the drive plate 54 by means of the hydraulic ram 64. General movement of the knee 50 on the beam 39 is caused by movement of the chain 44 driven by the shaft 47.

The elongated hydraulic rams 28 (FIGURES 11-14) for driving the carriage 27 past the saw 22 each include a plurality of pipe sections 103 having their opposite ends externally threaded and connected in aligned relation by couplers 104. A fitting 105 is threaded on to one end of one of the pipe sections 103 and has a threaded bore 106 extending therethrough to communicate with the interior of the pipe section 103. A fitting 107 is threaded on to the end of one of the pipe sections 103 at the opposite end of the hydraulic ram 28 from the fitting 105. The fitting 107 includes a plurality of seals 108 and an annular clamp 109 binding the seals 108 therein by means of a plurality of bolts 110. A plurality of bronze tubular bushings 111 are positioned in spaced apart relation within the pipe sections 103 and are maintained in spaced apart relation by a plurality of tubular steel spacers 112. The tubular steel spacers 112 are perforated at 113 to prevent hydraulic fluid from swelling the spacers 112 into tight engagement with the internal surface of the pipe sections 103.

A combined tubular sectional piston and piston rod, indicated generally at 114, is connected by threaded joints 115 having a sealing O-ring 116 positioned therein. The combined piston and piston rod 114 has a hollow bore which is closed at one end by a solid plug 118 and at the opposite end by a threaded plug 119. The piston rod and piston 114 are tapered at 120 at the end thereof in which is mounted the solid plug 118. The opposite end of the combined piston and piston rod 114 is secured to the carriage 27 by means of a bracket 121. A bore 122 is formed in the side of the combined piston and piston rod 114 adjacent the plug 118 to permit hydraulic fluid to flow into the bore 117 during the operation of the hydraulic ram 28. The combined piston and piston rod 114 is slidably mounted in the bushings 111 and is slidably carried by the seals 108 so that hydraulic fluid can be forced through the threaded bore 106 by means of a pipe 123 to push the combined piston and piston rod 114 out of the pipe sections 103. The bore 122 permits the hydraulic fluid to enter the bore 117 of the combined piston and piston rod 114 and thereby stiffens the combined piston and piston rod due to the internal pressure of the hydraulic fluid in the bore 117.

The accurate operation of the hydraulic servo cylinder 49 to move the control knee 48 is carried out by the apparatus illustrated in FIGURE 16 in the following manner. Hydraulic fluid under pressure is forced from a source (not shown) through a pipe 124, through an electro-magnetic control valve 125 and through a pipe 126, to the outer end of the hydraulic servo cylinder 49. The pipe 124 is also connected by a pipe 127 to a main reversing valve 130. The control valve 125 is also connected by a pipe 132 and the reversing valve 130 is connected by a pipe 133 to an oil reservoir 134. The outer end of the servo cylinder 49 is connected by a pipe 128 to the main reversing valve 130 and also by a pipe 129 having a check valve 131 therein to the exhaust pipe 133. The electro-magnetic control valve 125 admits fluid under pressure from the pipe 124 through the pipe 126 to the outer end of the hydraulic servo cylinder 49 and exhausts fluid under pressure from same through the pipes 126 and 132 to the reservoir 134; similarly, the main electro-magnetic reversing valve 130 admits fluids under pressure from the pipes 124 and 127 through the pipes 127 and 128 to the inner end of the hydraulic servo cylinder 49 and exhausts fluid under pressure from same through pipes 128 and 133 to the reservoir 134. Fast movement of the piston in the hydraulic servo cylinder 49 is provided through control of the electro-magnetic valves 125 and 130 and accurate subsequent incremental movement of the piston in the hydraulic servo cylinder 49 can be obtained for moving the control knee 48 to adjust the log for the next board to be cut therefrom.

A plurality of hydraulic cylinders 137–A, 137–B, 137–C, 137–D, 137–E, and 137–F are formed of successively increasing capacity and are each provided with a freely moving piston 138. An adjustable stop 139 is provided for adjustably limiting the movement of the free piston 138 in one direction to adjust the relative capacity of the cylinders 137–A, 137–B, 137–C, 137–D, 137–E, and 137–F. For reversing the direction of travel of the free pistons 138, there is provided a series of electro-magnetic reversing valves 140, one for each of the hydraulic cylinders 137–A, 137–B, 137–C, 137–D, 137–E and 137–F. A manifold 124–A is connected to the pipe 124 from the source of fluid under pressure anterior to the electromagnetic control valve 125. Branch pipes 135 extend from this manifold through the respective electro-magnetic reversing valve 140 and to one end of the respective hydraulic cylinders 137–A, 137–B, 137–C, 137–D, 137–E, and 137–F. Similarly, a manifold 126–A is connected to the pipe 126 between the electro-magnetic control valve 125 and the outer end of the hydraulic servo cylinder 49. Branch pipes 136 extend from this latter manifold through the respective electro-magnetic reversing valves 140 and to the opposite ends of the respective hydraulic cylinders 137–A, 137–B, 137–C, 137–D, 137–E and 137–F. The free piston 138 is forced to one end of the cylinder 137–A, etc. when the opposite end of the cylinder is connected to the pipe 135, manifold 124–A and pipe 124, and hydraulic fluid already in the cylinder 137–A is forced outwardly therefrom by the free piston 138 and through the pipe 136, manifold 126–A, and pipe 126 into the end 127 of the hydraulic ram 49 so as to move the control knee 48 an accurate, controlled amount in accordance with the capacity of the cylinder 137–A etc. Since the cylinders 137–A, 137–B, 137–C, 137–D, 137–E and 137–F are each of a different capacity, actuation of a selected one, or a selected group of these cylinders, will move the control knee 48 an accurate distance in addition to the distance the control knee was moved on actuation of the magnetic valve 125.

Figure 15:
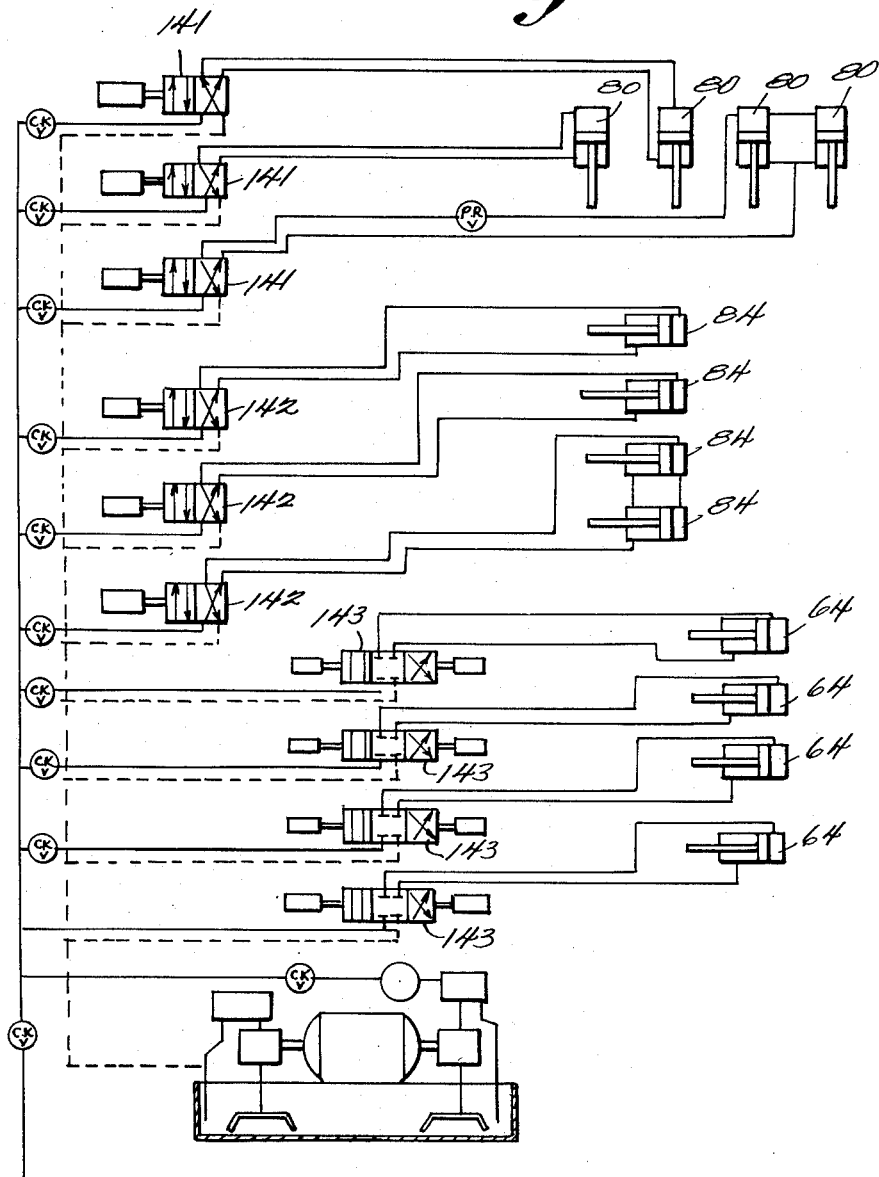
FIGURE 15 is a semi-diagrammatic view of the hydraulic dog control circuits.

In controlling the action of the knees 50, the dogs 92 are moved vertically by the hydraulic servo cylinder 80 controlled by a selected one of the electro-magnetic valves 141. The dogs 92 are moved in and out by the hydraulic servo cylinders 84 controlled by a selected one of the magnetic valves 142 (FIGURE 15). The knees 50 are individually and moved respectively by the hydraulic servo cylinder 64 to control the taper of same 50 by means of a selected one of the electro-magnetic valves 143.

The electro-magnetic valve 125 is controlled by a hand switch 144 (FIGURE 17) and the electro-magnetic valve 130 is controlled by a hand switch 145. The electromagnetic valves 141, controlling the movement of the dogs up and down, are controlled by a hand switch 146. The electro-magnetic valves 140 are controlled by a plurality of hand switches 147 and 148. The electromagnetic valves 142 are controlled by a hand switch 149 and the electro-magnetic valves 143 are controlled by a plurality of hand switches 150. The electrical control switches 144, 145, 146, 147, 148, 149 and 150 provide the operator of the sawmill with complete control over the operation of the carriage, the knees and the dogs so that accurate, fast cutting can be obtained.

Having thus described the preferred embodiment of the invention, it should be understood that numerous structural modifications and adaptations may be resorted to without departing from the scope of the appended claims.

What is claimed is:

1. In a saw mill carriage, a knee mounted on the carriage for reciprocable movement transversely of the latter to present pre-determined thicknesses of a log on the carriage to a saw, an hydraulic servo cylinder, a piston reciprocable in said cylinder, a rod connecting the piston to the knee, a control valve for admitting fluid under pressure to and exhausting fluid under pressure from the hydraulic servo cylinder, a conduit from a source of fluid under pressure connected to the control valve, a conduit from the control valve to one end of the hydraulic servo cylinder, a reservoir and a conduit from the control valve to the reservoir, a first manifold connected to the conduit from the fluid pressure source anterior to the control valve, a second manifold connected to the conduit between the control valve and the hydraulic servo cylinder, a plurality of cylinder units, a floating piston in each of said cylinder units, adjustment means on each cylinder unit for setting the floating piston at varying distances from the opposite ends of the cylinder unit, a first series of branches connecting the first manifold to one end of the respective cylinder units, and a second series of branch conduits connecting the other ends of the respective cylinder units to the second manifold.

2. In a saw mill carriage, a knee mounted on the carriage for reciprocable movement transversely of the latter to present predetermined thicknesses of a log on the carriage to a saw, an hydraulic servo cylinder, a piston reciprocable in said cylinder, a rod connecting the piston to the knee, a control valve for admitting fluid under pressure to and exhausting fluid under pressure from the hydraulic servo cylinder, a conduit from a source of fluid under pressure to the control valve, a conduit from the control valve to one end of the hydraulic servo cylinder, a reservoir, and a conduit from the control valve to the reservoir, a first manifold connected to the conduit from the fluid pressure source anterior to the control valve, a second manifold connected to the conduit between the control valve and the hydraulic cylinder, a plurality of cylinder units, a floating piston in each of said cylinder units, adjustment means on each cylinder unit for setting the floating piston at varying distances from the opposite ends of the cylinder unit, a reversing valve for each cylinder unit, a first series of branch conduits connecting the first manifold to the respective reversing valves and the latter to one end of the respective cylinder units, and a second series of branch conduits connecting the other ends of the respective cylinder units to the reversing valves and the latter to the second manifold.

3. In a saw mill carriage, a knee mounted on the carriage for reciprocable movement transversely of the latter to present predetermined thicknesses of a log on the carriage to a saw, an hydraulic servo cylinder, a piston reciprocable in said cylinder, a rod connecting the piston to the knee, a control valve for admitting fluid under pressure to and exhausting fluid under pressure from the hydraulic servo cylinder, a conduit from a source of fluid under pressure connected to the control valve, a conduit from the control valve to one end of the hydraulic servo cylinder, a reservoir, and a conduit from the control valve to the reservoir, a reversing valve for the hydraulic servo cylinder, a conduit connecting the conduit from the source of fluid under pressure to the reversing valve, a conduit connecting the reversing valve to the other end of the hydraulic servo cylinder, a first manifold connected to the conduit from the fluid pressure source anterior to the control valve, a second manifold connected to the conduit between the control valve and the hydraulic servo cylinder, a plurality of cylinder units, a floating piston in each of said cylinder units, adjustment means on each cylinder unit for setting the floating piston at varying distances from the opposite ends of the cylinder unit, a first series of branch conduits connecting the first manifold to one of the respective cylinder units, and a second series of branch conduits connecting the other ends of the respective cylinder units to the second manifold.

4. In a saw mill carriage, a knee mounted on the carriage for reciprocable movement transversely of the latter to present predetermined thicknesses of a log on the carriage to a saw, an hydraulic servo cylinder, a piston reciprocable in said cylinder, a rod connecting the piston to the knee, a control valve for admitting fluid under pressure to and exhausting fluid under pressure from the hydraulic servo cylinder, a conduit from the source of fluid under pressure connected to the control valve, a conduit from the control valve to one end of the hydraulic servo cylinder, an oil reservoir and a conduit from the control valve to the reservoir, a reversing valve for the hydraulic servo cylinder, a conduit connecting the conduit from the source of fluid under pressure to the reversing valve, a conduit connecting the reversing valve to the oil reservoir, and a conduit connecting the reversing valve to the other end of the hydraulic cylinder, a first manifold connected to the conduit from the fluid pressure source anterior to the control valve, a second manifold connected to the conduit between the control valve and the hydraulic servo cylinder, a plurality of cylinder units, a floating piston in each of said cylinder units, adjustment means on each cylinder unit for setting the floating piston at varying distances from the opposite ends of the cylinder unit, a first series of branch conduits connecting the first manifold to one end of the respective cylinder units, and a second series of branch conduits connecting the other ends of the respective cylinder units to the second manifold.

References Cited in the file of this patent

UNITED STATES PATENTS

| | | |
|---|---|---|
| 113,866 | Ferry | Apr. 18, 1871 |
| 274,286 | Davies | Mar. 20, 1883 |
| 317,256 | Wilkin | May 5, 1885 |
| 1,590,105 | Martin | June 22, 1926 |
| 1,930,014 | Martin | Oct. 10, 1933 |
| 2,318,163 | Kahr | May 4, 1943 |
| 2,361,326 | Silver | Oct. 24, 1944 |
| 2,613,703 | Calvert | Oct. 14, 1952 |
| 2,640,513 | Watson et al. | June 2, 1953 |
| 2,661,779 | Saunders | Dec. 8, 1953 |
| 2,696,853 | Balch et al. | Dec. 14, 1954 |
| 2,714,906 | Peterson | Aug. 9, 1955 |
| 2,822,006 | Anderegg et al. | Feb. 4, 1958 |
| 2,923,131 | Furman et al. | Feb. 2, 1960 |